United States Patent
Iwade

(10) Patent No.: US 11,677,843 B2
(45) Date of Patent: Jun. 13, 2023

(54) SERVER APPARATUS AND CONTENT SPECIFYING METHOD

(71) Applicant: Takayoshi Iwade, Tokyo (JP)

(72) Inventor: Takayoshi Iwade, Tokyo (JP)

( * ) Notice: Subject to any disclaimer, the term of this patent is extended or adjusted under 35 U.S.C. 154(b) by 176 days.

(21) Appl. No.: 17/326,909

(22) Filed: May 21, 2021

(65) Prior Publication Data

US 2021/0281649 A1 Sep. 9, 2021

Related U.S. Application Data

(63) Continuation of application No. PCT/JP2019/045235, filed on Nov. 19, 2019.

(30) Foreign Application Priority Data

Nov. 27, 2018 (JP) .............................. JP2018-220802

(51) Int. Cl.
*H04L 67/51* (2022.01)
*G06Q 30/0251* (2023.01)
*G06Q 30/0282* (2023.01)

(52) U.S. Cl.
CPC ......... *H04L 67/51* (2022.05); *G06Q 30/0255* (2013.01); *G06Q 30/0261* (2013.01); *G06Q 30/0282* (2013.01)

(58) Field of Classification Search
None
See application file for complete search history.

(56) References Cited

U.S. PATENT DOCUMENTS

| 10,993,160 | B2 * | 4/2021 | Mackenzie | ....... H04W 36/0083 |
| 2009/0239510 | A1 * | 9/2009 | Sennett | .............. G06Q 30/0267 |
| | | | | 455/414.1 |
| 2017/0257750 | A1 * | 9/2017 | Gunasekara | ............ H04W 4/02 |

FOREIGN PATENT DOCUMENTS

| JP | 2004-070419 | | 3/2004 |
| JP | 2009-188922 | | 8/2009 |
| JP | 2009188922 | A * | 8/2009 |
| JP | 5419953 | | 2/2014 |

(Continued)

OTHER PUBLICATIONS

WIPO, International Search Report in corresponding PCT application PCT/JP2019/045235, dated Feb. 4, 2020.

(Continued)

*Primary Examiner* — Lance Leonard Barry
(74) *Attorney, Agent, or Firm* — Ryan Alley IP

(57) ABSTRACT

A sending and receiving unit receives the unique information of a plurality of communication host apparatuses that is obtained when a client apparatus searches for a connection destination before and after a movement of the client apparatus, a storage unit stores therein identification information of content that is sent to the client apparatus according to a state of the client apparatus, in association with the state, and a control unit specifies the state of the client apparatus on the basis of the unique information received by the sending and receiving unit, the unique information being obtained before and after the movement, and specifies first or second content depending on whether the client apparatus is an in overlapping area covered by communication host apparatuses with reference to the storage unit and sends the specified content to the client apparatus.

3 Claims, 15 Drawing Sheets

| LAST AREA | CURRENT AREA | STATE |
|---|---|---|
| NO AREA | A | NEWLY ENTER A |
| A | A | STAY IN A |
| A | A AND B | ENTER COMMON AREA OF A AND B |
| A AND B | B | ENTER B AND LEAVE A |
| B | B AND D | ENTER COMMON AREA OF B AND D |
| B AND D | D | ENTER D AND LEAVE B |

(56) References Cited

FOREIGN PATENT DOCUMENTS

JP         5419953 B2 *  2/2014
JP      2017-134781      8/2017

OTHER PUBLICATIONS

WIPO, Written Opinion in corresponding PCT application PCT/JP2019/045235, dated Feb. 4, 2020 (with machine translation).

* cited by examiner

CONTENT PROVIDER
MANAGEMENT TABLE
T1

| CONTENT PROVIDER ID | CONTENT PROVIDER | COMPANY ID | PRIVILEGE |
|---|---|---|---|
| 0001 | ... | ... | ... |
| 0002 | ... | ... | ... |

FIG. 6

HISTORY TABLE
T4

| RECEIPT TIME | LAST AND CURRENT | CURRENT LOCATION |
|---|---|---|
| 00:00:01 | 0 | null |
| 00:00:01 | 1 | 000A |
| 00:00:10 | 0 | 000A |
| 00:00:10 | 1 | 000A |
| 00:00:20 | 0 | 000A |
| 00:00:20 | 1 | 000A |
| 00:00:20 | 1 | 000B |

FIG. 9

T5 CONDITION TABLE

| CONDITION ID | LAST HOST ID | CURRENT HOST ID | COMBINING CONDITION | NEXT CONDITION ID | CONTENT ID |
|---|---|---|---|---|---|
| 1 | 000A | 000A | null | null | ... |
| 2 | 000A | 000A | and | 3 | ... |
| 3 | 000B | 000B | null | null | ... |

FIG. 10

T8 NEXT CONDITION ID SETTING TABLE

| CONDITION DISPLAY PERMISSIBILITY FLAG | DISPLAY PERMISSIBILITY FLAG | DISPLAY PERMISSIBILITY DETERMINATION RESULT | |
|---|---|---|---|
| | | COMBINING CONDITION "AND" | COMBINING CONDITION "OR" |
| 1 | null | 1 | 1 |
| | 0 | 0 | 1 |
| | 1 | 1 | 1 |
| 0 | null | 0 | 0 |
| | 0 | 0 | 0 |
| | 1 | 0 | 1 |

FIG. 15

SERVER APPARATUS AND CONTENT SPECIFYING METHOD

RELATED APPLICATIONS

This application claims priority under 35 U.S.C. § 120 to, and is a continuation of, co-pending International Application PCT/JP2019/045235, filed Nov. 19, 2019 and designating the US, which claims priority to Japanese Application 2018-220802, filed Nov. 27, 2018, such Japanese Application also being claimed priority to under 35 U.S.C. § 119. These Japanese and International applications are incorporated by reference herein in their entireties.

FIELD

The embodiment discussed herein relates to a server apparatus and a content specifying method.

BACKGROUND

There is known a method of providing an information communication service according to a user position based on a mobile terminal. For example, there is known an information processing method in a client-server information processing system in which a plurality of terminal devices and a server are connected over a network. In this information processing method, when a terminal device makes an access to a start screen of a search service in the vicinity of a specific wireless local area network (LAN) base station, the terminal device obtains the media access control (MAC) address of the base station and sends the MAC address together with user input information to the server, and the server stores the MAC address and the user input information in association with each other in an address-user input information storage means, extracts a specific MAC address that is statistically significant and the user input information from the address-user input information storage means, and stores them in a feature storage means.

Please see, for example, Japanese Patent No. 5419953.

Japanese Patent No. 5419953 describes "even in a place where precise positioning is not able to be performed, input assistance according to the location of a user's terminal device, adjustment of a search result, and other functions of a server-client service according to the user position are provided." However, from the perspective of information and content providers, information and content are provided according to user operations and search information. Therefore, it is still difficult to provide content for users in specific areas.

SUMMARY

According to one aspect, there is provided a server apparatus including: a memory which stores therein identification information of content that is sent to a client apparatus according to a state of the client apparatus, in association with the state; and a processor which performs a process including receiving unique information of communication host apparatuses, the unique information being obtained by the client apparatus searching for a connection destination before and after a movement of the client apparatus, specifying areas covered by the communication host apparatuses, based on the unique information received, the unique information being obtained before and after the movement, determining, upon determining that the client apparatus is in a first area covered by a first communication host apparatus before the movement, whether the client apparatus is in an overlapping area of the first area and a second area covered by one or more second communication host apparatuses after the movement, specifying first content with reference to the memory upon determining that the client apparatus is in the overlapping area, and specifying second content with reference to the memory upon determining that the client apparatus is not in the overlapping area, and sending the specified content to the client apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a content provider management table;
FIG. 9 illustrates an example of a history table;
FIG. 10 illustrates an example of a condition table;
FIG. 15 is a view for explaining a next condition ID setting table.

DETAILED DESCRIPTION

Hereinafter, a system of one embodiment will be described in detail with reference to the accompanying drawings.

(Embodiment)

Figure 1:
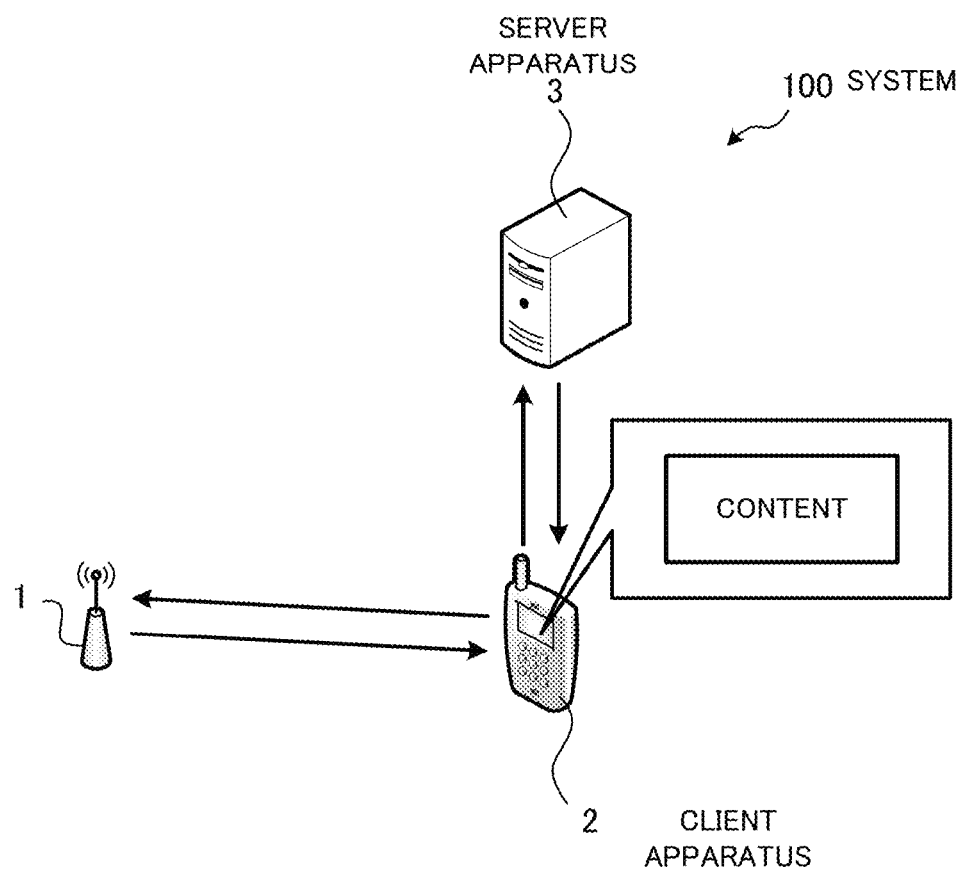
FIG. 1 illustrates a system according to one embodiment.

FIG. 1 illustrates a system according to one embodiment.

The system 100 of the embodiment includes a plurality of communication host apparatuses 1, a client apparatus 2, and a server apparatus 3.

Each communication host apparatus 1 is a Wi-Fi router or the like, for example, and has specific unique information (for example, MAC address or the like).

The client apparatus 2 is owned by a person (user) who would like to obtain information over a network such as the Internet. Examples of the client apparatus 2 include a mobile telephone, a smartphone, a tablet terminal device, a car navigation systems, and other mobile terminal devices.

The client apparatus 2 has a function of communicating with each communication host apparatus 1 wirelessly, via Bluetooth (registered trademark), or the like. The client apparatus 2 searches for a communication host apparatus 1 existing in the vicinity of the client apparatus 2 at prescribed time intervals or according to a user operation and obtains the unique information of the communication host apparatus 1. When the client apparatus 2 finds a plurality of communication host apparatuses 1, it obtains the unique information of the individual communication host apparatuses 1. For this search, the client apparatus 2 does not need to connect to the communication host apparatuses 1.

The client apparatus 2 sends to the server apparatus 3 the unique information obtained at each timing.

In addition, when receiving content, to be described later, from the server apparatus 3, the client apparatus 2 displays the content on a screen of the client apparatus 2.

The server apparatus 3 stores the unique information sent from the client apparatus 2 in association with the receipt time of the unique information.

The server apparatus 3 calculates the difference between the last received unique information and the currently received unique information to determine the current location of the client apparatus 2. The server apparatus 3 then sends, to the client apparatus 2, content linked to the individual communication host apparatuses 1 located in the vicinity of the determined current location of the client apparatus 2. Examples of the content include recommendation places (restaurants, sightseeing spots, and others) existing in the vicinity of the individual communication host apparatuses 1 and notices (routes, prohibited areas, and others).

In addition, in the embodiment, people who manage the communication host apparatuses 1 and provide users with specific information are referred to as "content providers."

Figure 2:
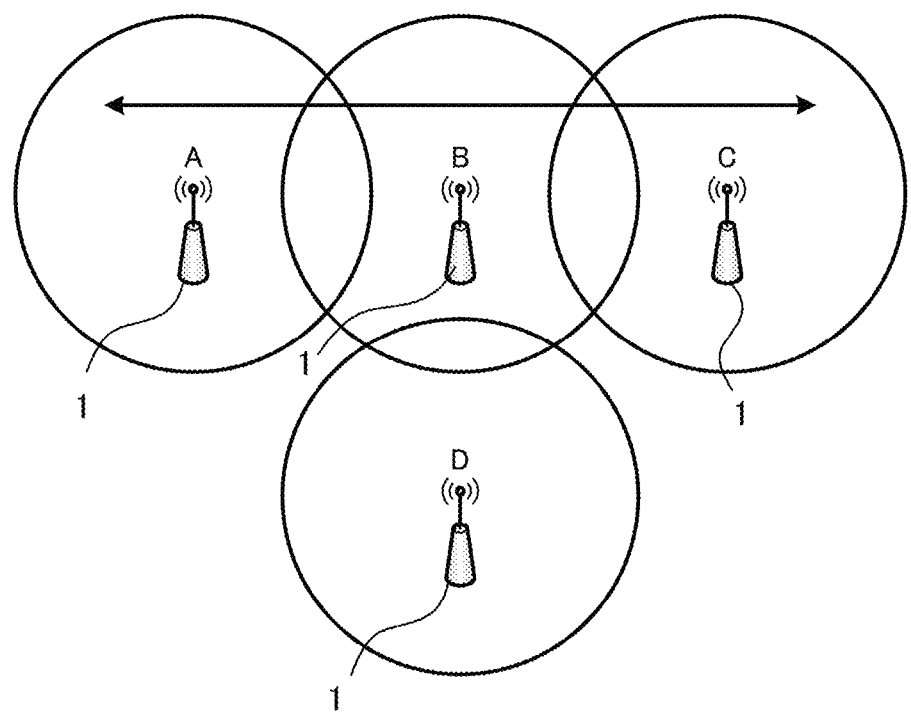
FIG. 2 is a view for explaining an example of a unique information acquisition method.

FIG. 2 is a view for explaining an example of a unique information acquisition method.

In FIG. 2, four communication host apparatuses 1 are provided with some space therebetween. Areas A, B, C, and D are covered by the respective communication host apparatuses 1. Overlapping areas between the areas A and B, between the areas B and C, and between the areas B and D are areas where the client apparatus 2 is able to obtain two unique information pieces.

The server apparatus 3 is able to determine the state of the client apparatus 2 using a prepared table on the basis of information received from the client apparatus 2.

For example, in the case where area information received last time from the client apparatus 2 indicates "no area" and area information received this time indicates "A," it means that the client apparatus 2 newly enters the area A, as illustrated in FIG. 2. In the case where the area information received last time from the client apparatus 2 indicates "A" and the area information received this time indicates "A", it means that the client apparatus 2 stays in the area A.

For example, in the case where a route passing through the areas A, B, and C in this order is set, the server apparatus 3 determines that the client apparatus 2 is off the route when the server apparatus 3 determines that the client 2 has entered the area D.

In the case where a route guide leading to the area C is installed in the area B, the server apparatus 3 is able to represent how much the guide is followed, in a numerical value. Therefore, the effectiveness of the route guide is able to be converted into a specific numerical value.

The following specifically describes the disclosed system.

Figure 3:
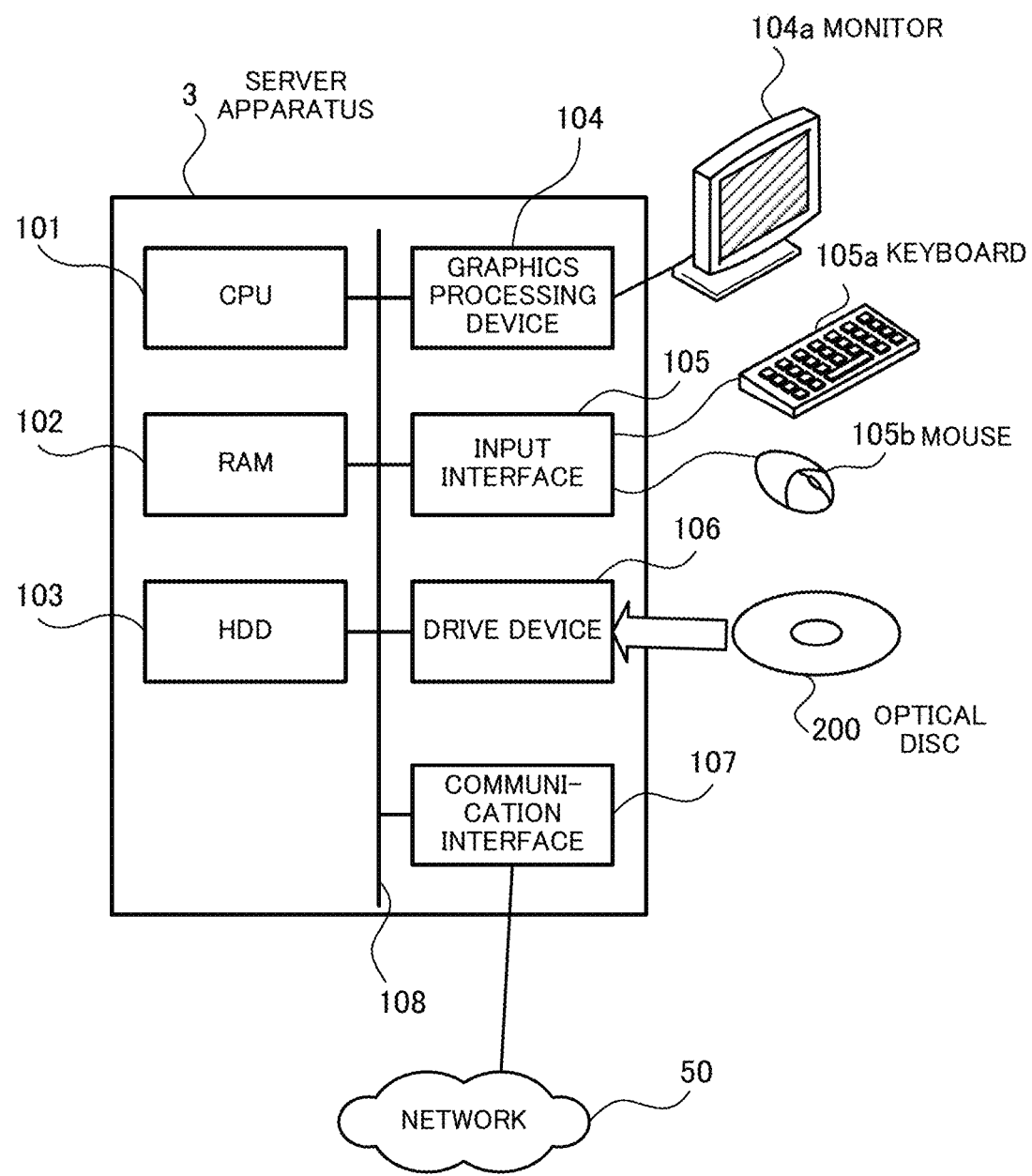
FIG. 3 illustrates a hardware configuration of a server apparatus according to the embodiment.

FIG. 3 illustrates the hardware configuration of the server apparatus according to the embodiment.

The server apparatus 3 is entirely controlled by a CPU (central processing unit) 101. A RAM (random access memory) 102 and a plurality of peripheral devices are connected to the CPU 101 via a bus 108.

The RAM 102 is used as a main storage device of the server apparatus 3. The RAM 102 temporarily stores therein at least part of OS (operating system) programs and application programs that are executed by the CPU 101. In addition, the RAM 102 stores therein various kinds of data to be used by the CPU 101 in processing.

Connected to the bus 108 are a hard disk drive (HDD) 103, a graphics processing device 104, an input interface 105, a drive device 106, and a communication interface 107.

The HDD 103 magnetically writes and reads data on a built-in disk. The HDD 103 is used as an auxiliary storage device of the server apparatus 3. The OS programs, application programs, and various kinds of data are stored in the HDD 103. A semiconductor storage device, such as a flash memory, may be used as the auxiliary storage device.

A monitor 104a is connected to the graphics processing device 104. The graphics processing device 104 displays images on a screen of the monitor 104a in accordance with instructions from the CPU 101. Examples of the monitor 104a include a display device using CRT (cathode ray tube) and a liquid crystal display.

Connected to the input interface 105 are a keyboard 105a and a mouse 105b. The input interface 105 gives signals received from the keyboard 105a and mouse 105b to the CPU 101. The mouse 105b is an example of a pointing device, and another kind of pointing device may be used. Other examples of the pointing device include a touch panel, a tablet, a touchpad, and a trackball.

The drive device 106 reads data from, for example, a portable storage medium such as an optical disc, on which data is recorded so as to be readable with reflection of light, or a USB (universal serial bus) memory. For example, in the case where the drive device 106 is an optical drive device, data recorded on an optical disc 200 may be read with laser light or the like. Examples of the optical disc 200 include Blu-ray (registered trademark), DVD (digital versatile disc), DVD-RAM, CD-ROM (compact disc read only memory), CD-R (recordable), and CD-RW (rewritable).

The communication interface 107 is connected to a network 50. The communication interface 107 communicates data with another computer or communication device over the network 50.

With the above hardware configuration, the processing functions of the embodiment may be implemented.

Figure 4:
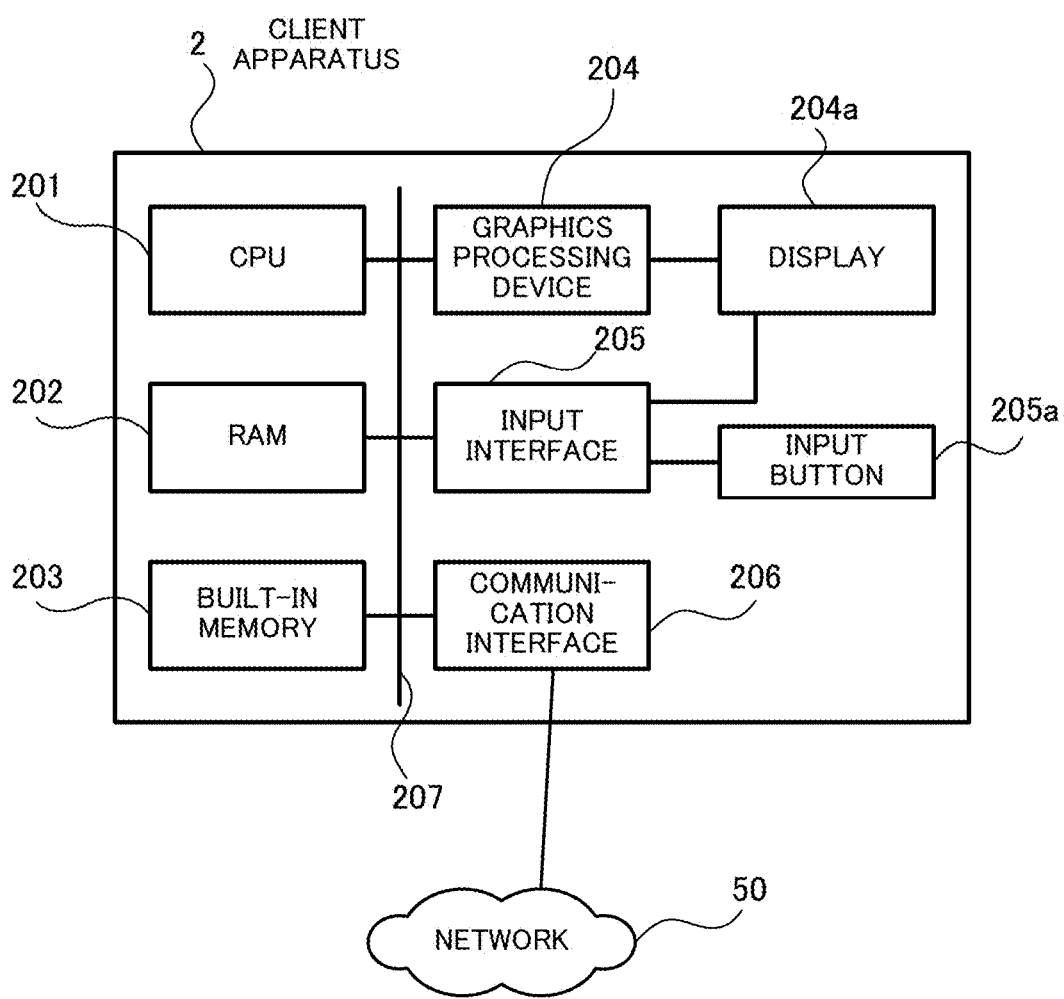
FIG. 4 illustrates a hardware configuration of a client apparatus according to the embodiment.

FIG. 4 illustrates a hardware configuration of the client apparatus according to the embodiment.

The client apparatus 2 is entirely controlled by a CPU (central processing unit) 201.

A RAM (random access memory) 202 and a plurality of peripheral devices are connected to the CPU 201 via a bus 207.

The RAM 202 is used as a main storage device of the client apparatus 2. The RAM 202 temporarily stores therein at least part of OS (operating system) programs and application programs that are executed by the CPU 201. In addition, the RAM 202 stores therein various kinds of data to be used by the CPU 201 in processing.

Connected to the bus 207 are a built-in memory 203, a graphics processing device 204, an input interface 205, and a communication interface 206.

The built-in memory 203 is used for data write and read. The built-in memory 203 is used as an auxiliary storage device of the client apparatus 2. The OS programs, application programs, and various kinds of data are stored in the built-in memory 203. A semiconductor storage device, such as a flash memory, may be used as the built-in memory.

A display 204a is connected to the graphics processing device 204. The graphics processing device 204 displays images on a screen of the display 204a in accordance with instructions from the CPU 201. Examples of the display 204a include a liquid crystal display. In addition, the display 204a has a touch panel function.

The display 204a and an input button 205 are connected to the input interface 205a. The input interface 205 gives signals received from the input button 205a and the touch panel of the display 204a to the CPU 201.

The communication interface 206 is connected to the network 50. The communication interface 206 communicates data with another computer or communication device over the network 50.

With the above hardware configuration, the processing functions of the embodiment may be implemented.

The server apparatus 3 with the hardware configuration illustrated in FIG. 3 has the following functions.

Figure 5:
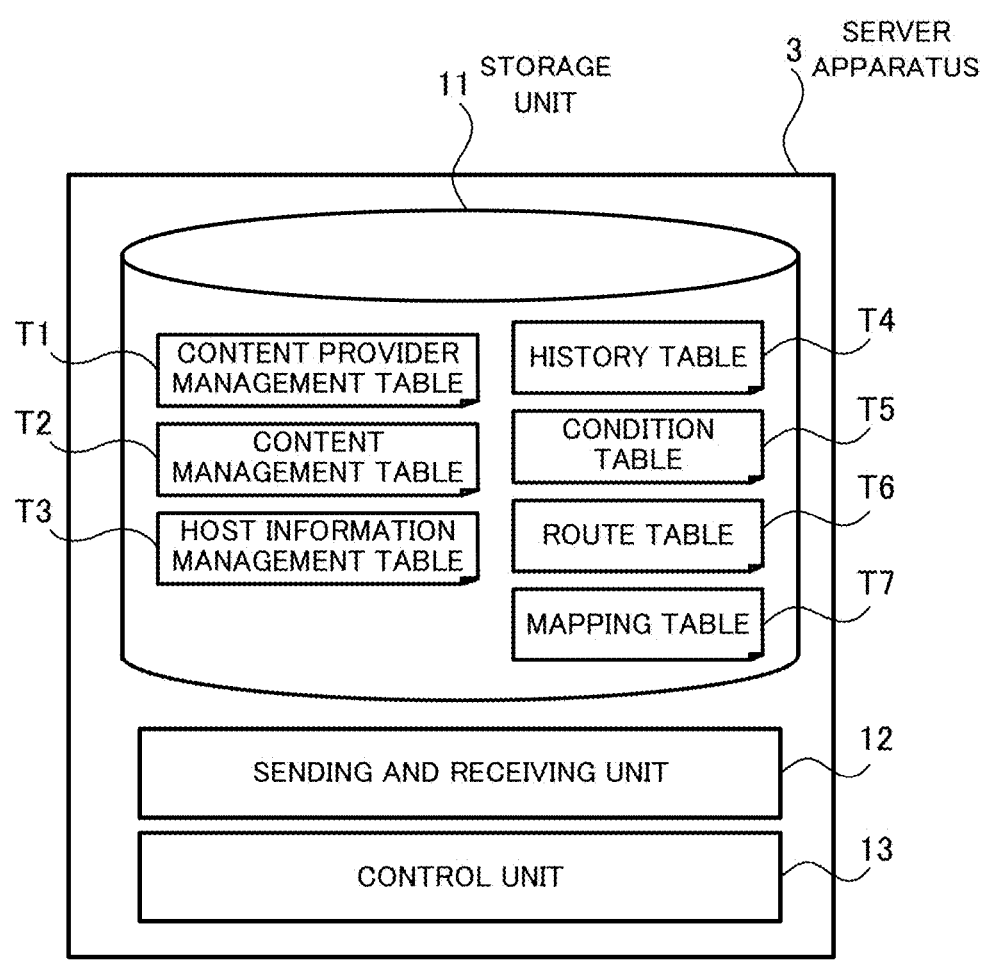
FIG. 5 is a block diagram illustrating the functions of the server apparatus according to the embodiment.

FIG. 5 is a block diagram illustrating the functions of the server apparatus according to the embodiment.

The server apparatus 3 includes a storage unit 11, a sending and receiving unit 12, and a control unit 13.

The storage unit 11 stores therein a content provider management table T1, a content management table T2, a host information management table T3, a history table T4, a condition table T5, a route table T6, and a mapping table T7.

FIG. 6 illustrates an example of the content provider management table.

The content provider management table T1 has the following columns: Content Provider ID, Content Provider, Company ID, and Privilege. Information pieces arranged in a horizontal direction are associated with each other.

The Content Provider ID column contains an ID identifying a content provider.

The Content Provider column contains the name of the content provider.

The Company column contains an ID identifying a company to which the content provider belongs. When the content provider is a private person, the company column may remain blank.

The Privilege column contains information indicating privileges of the content provider. Examples of the privileges include a privilege to access statistical information of the route table T6, a privilege to refer to the contents of the content management table T2, and a privilege of update.

In this connection, the content provider management table T1 may store therein, other than the information illustrated, contact information (mail address or the like), the English notation of a company name, a representative name, address, and others.

Figure 7:
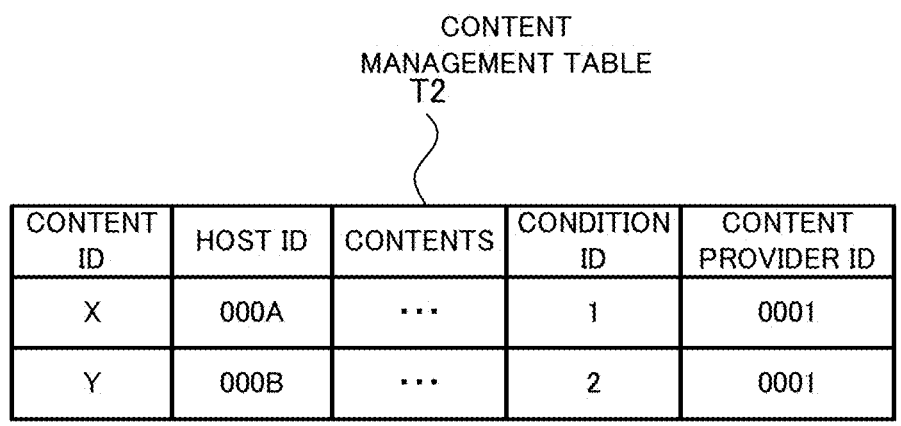
FIG. 7 illustrates an example of a content management table.

FIG. 7 illustrates an example of the content management table.

The content management table T2 contains the following columns: Content ID, Host ID, Contents, Condition ID, and Content Provider ID. Information pieces arranged in a horizontal direction are associated with each other.

The Content ID column contains an ID identifying content.

The Host ID column contains a value identifying a communication host apparatus 1. For example, the communication host apparatus 1 in the area A has a host ID of "000A," the communication host apparatus 1 in the area B has a host ID of "000B," the communication host apparatus 1 in the area C has a host ID of "000C," and the communication host apparatus 1 in the area D has a host ID of "000D."

The Contents column contains the contents or summary of the content that is sent to the client apparatus 2. For example, the contents of the content include information on restaurants located in an area, guide information that is displayed during a movement following a route, and others.

The Condition ID column contains an ID identifying a condition, which will be described later.

The Content Provider ID column contains the content provider ID of a content provider that provides the content.

Figure 8:
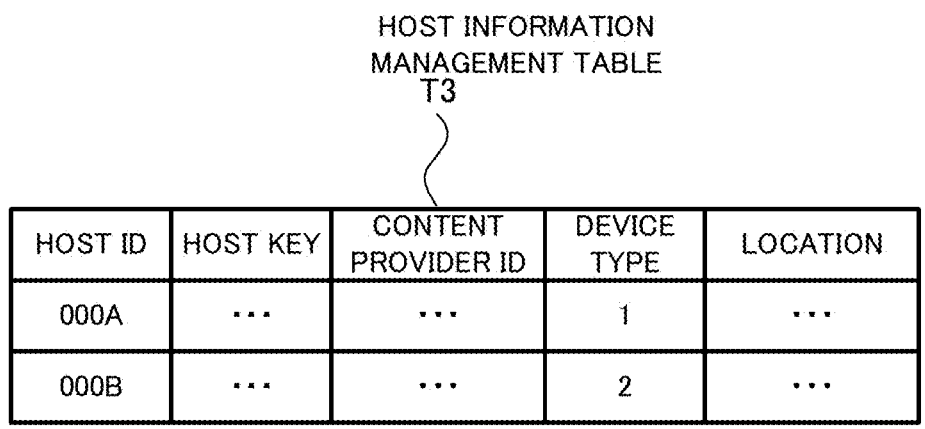
FIG. 8 illustrates an example of a host information management table.

FIG. 8 illustrates an example of the host information management table.

The host information management table T3 has the following columns: Host ID, Host Key, Content Provider ID, Device Type, and Location. Information pieces arranged in a horizontal direction are associated with each other. The Host ID column contains the host ID of a communication host apparatus 1.

The Host Key column contains specific unique information (for example, MAC address or the like) of the communication host apparatus 1.

The Content Provider ID column contains the ID of a content provider.

The Device Type column contains information identifying the device type of the communication host apparatus 1.

The Location column contains information identifying the location of the communication host apparatus 1.

FIG. 9 illustrates an example of the history table.

The history table T4 has the following columns: Receipt Time, Last and Current, and Current Location. Information pieces arranged in a horizontal direction are associated with each other.

The Receipt Time column contains a time when the sending and receiving unit 12 receives a host ID from the client apparatus 2.

The Last and Current column contains a value identifying the last time or the current time, "0" indicating the last time and "1" indicating the current time.

The Current Location column contains a host ID that indicates an area where the client apparatus 2 is located. In the case where the client apparatus 2 is not located in any area, "null" is set.

With reference to the history table T4, the control unit 13 is able to statistically obtain a moving route of the client apparatus 2.

For example, using FIG. 2 and the history table T4, it is confirmed from two records with a receipt time of "00:00:01" that the client apparatus 2 is not located in any area at first (last time) and then newly enters the area A (current time). In addition, it is confirmed from three records with a receipt time of "00:00:20" that the client apparatus 2 is located in the area A at first (last time) and then enters an overlapping area of the areas A and B (current time).

FIG. 10 illustrates an example of the condition table.

The condition table T5 contains the following columns: Condition ID, Last Host ID, Current Host ID, Combining Condition, Next Condition ID, and Content ID. Information pieces arranged in a horizontal direction are associated with each other.

The Condition ID column contains an ID identifying a condition for determining whether to allow the display of prescribed content on the screen of the client apparatus 2.

The Last Host ID column contains a host ID that corresponds to a last and current flag of "0" set in the history table T4.

The Current Host ID column contains a host ID that corresponds to a last and current flag of "1" set in the history table T4.

The Combining Condition column contains information identifying whether to use a next condition. Here, "null" is set to indicate that the next condition is not used, and "and" or "or" is set to indicate the next condition is used.

The Next Condition ID column contains the next condition ID of a next condition that is used when the Combing Condition column contains "and" or "or." For example, the second record has a combining condition of "and" and a next condition ID of "3". This means that, when both the condition of the record with a condition ID of "2" and the condition of the record with a condition ID of "3" are satisfied, the control unit 13 determines that the condition is satisfied.

Figure 11:
FIG. 11 illustrates an example of a route table.

FIG. 11 illustrates an example of the route table.

The route table T6 contains the following columns: Route ID, Host ID, Sequence, and Company ID. Information pieces arranged in a horizontal direction are associated with each other.

The Route ID column contains an ID identifying a route.

The Host ID column contains the host IDs of communication host apparatuses 1 forming the route.

The Sequence column contains information identifying an order of passing the route. Referring to the example of FIG. 11, for a route ID of "r1," information indicating that a route passes the areas A, B, and C in this order is set.

The Company ID column contains the name of a company to which a content provider belongs.

Figure 12:
FIG. 12 illustrates an example of a mapping table.

FIG. 12 illustrates an example of the mapping table.

The mapping table T7 has the following columns: Host ID and Content ID. Information pieces arranged in a horizontal direction are associated with each other.

The Host ID column contains a host ID.

The Content ID column contains the content ID of content that is planned to be displayed when the client apparatus 2 is located in the vicinity of the communication host apparatus 1 with the host ID.

The following describes how the control unit 13 operates, with reference to a flowchart.

Figure 13:
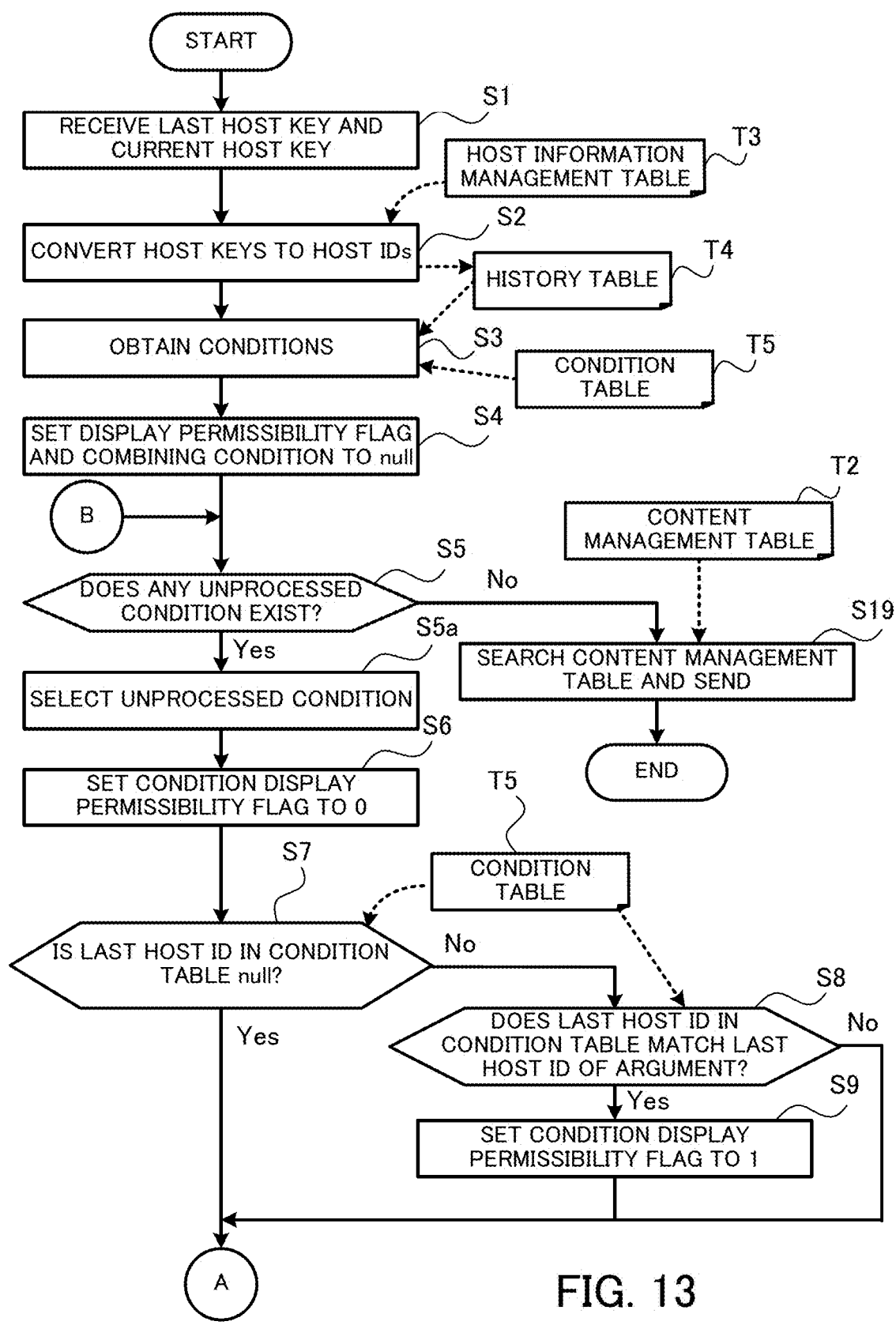
FIG. 13 is a flowchart for explaining how a control unit operates.
Figure 14:
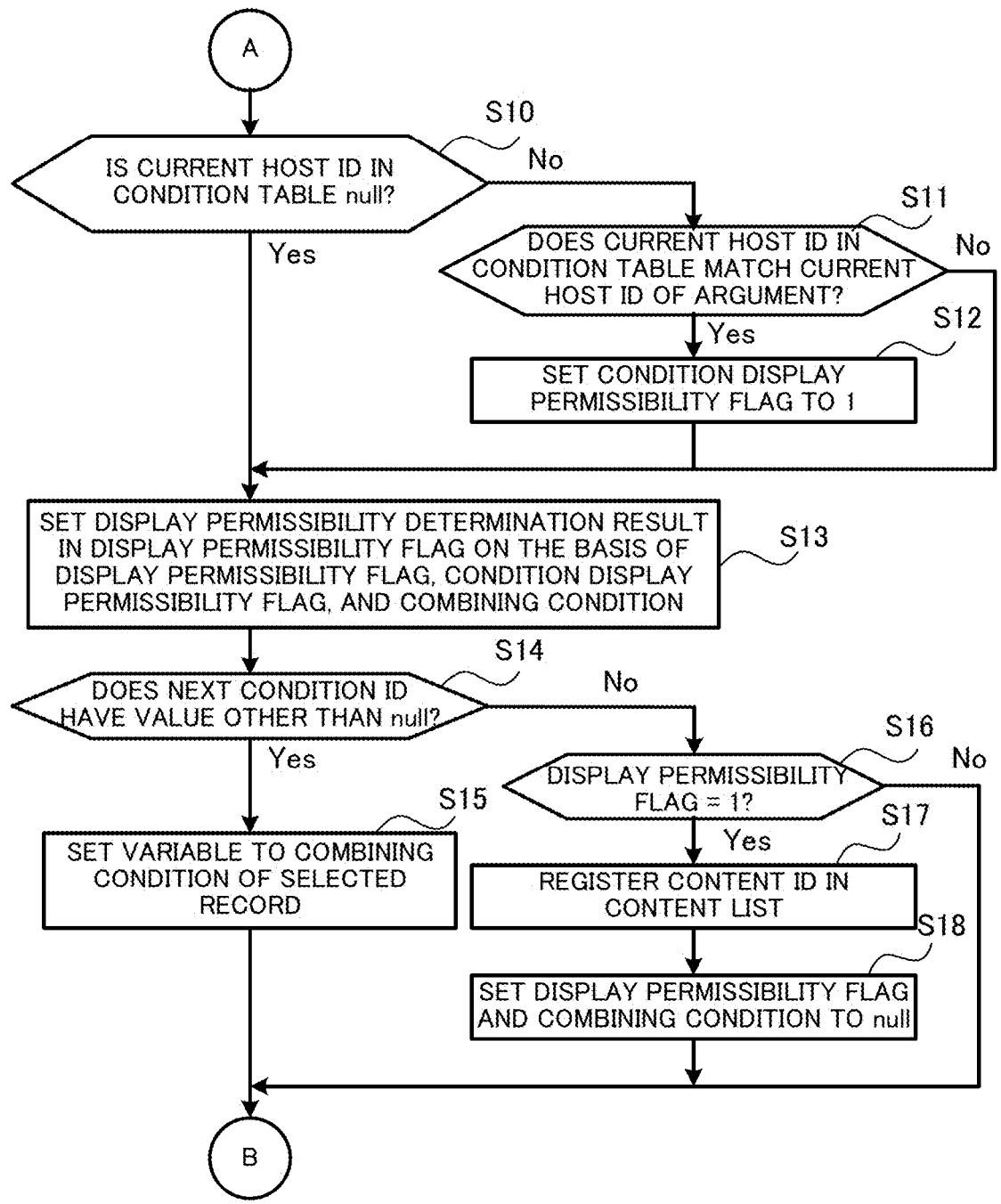
FIG. 14 is a flowchart for explaining how the control unit operates.

FIGS. 13 and 14 are a flowchart for explaining how the control unit operates.

In the following process, arguments and variables are defined as follows:

Arguments: last host key, current host key

Variables: display permissibility flag, combining condition, condition display permissibility flag (Step S1) The sending and receiving unit 12 receives a last host key and a current host key. Then, the process proceeds to step S2.

(Step S2) The control unit 13 obtains the host IDs corresponding to the last host key and current host key with reference to the host information management table T3 (convert to host IDs). The control unit 13 stores the obtained host IDs together with the receipt time in the history table T4. Then, the process proceeds to step S3.

(Step S3) The control unit 13 obtains records relating to all conditions corresponding to the last host key and current host key received at step S1, with reference to the condition table T5.

More specifically, the control unit 13 determines whether the same host ID as the last host ID received at step S1 is included in the Last Host ID column of the condition table T5. If the same host ID is found, records relating to the conditions including the host ID is extracted.

Alternatively, the control unit 13 determines whether the same host ID as the current host ID received at step S1 is included in the Current Host ID column of the condition table T5. If the same host ID is found, records relating to the conditions including the host ID is extracted.

The control unit 13 obtains all conditions (including the next conditions) by searching the condition table T5 with the condition IDs of the extracted records. Then the process proceeds to step S4.

(Step S4) The control unit 13 sets the display permissibility flag (variable) to "null." The control unit 13 also sets the combining condition (variable) to "null." Then, the process proceeds to step S5.

(Step S5) The control unit 13 determines whether there is any of the conditions extracted at step S3 that is not yet processed. If any condition is not yet processed (yes at step S5), the process proceeds to step S5a. If all the conditions are already processed (no at step S5), the process proceeds to step S19.

(Step S5a) The control unit 13 selects one of the unprocessed conditions. Then, the process proceeds to step S6.

(Step S6) The control unit 13 sets the condition display permissibility flag to "0." Then, the process proceeds to step S7.

(Step S7) The control unit 13 determines whether "null" is set in the Last Host ID column in the record (hereinafter, referred to as selected record) with the condition selected at step S5a. If "null" is set in the Last Host ID column (yes at step S7), the process proceeds to step S10. If "null" is not set in the Last Host ID column, i.e., if the Last Host ID column has a value other than "null" (no at step S7), the process proceeds to step S8.

(Step S8) The control unit 13 determines whether the last host ID in the selected record matches the last host ID received at step S1. If they match (yes at step S8), the process proceeds to step S9. If they do not match (no at step S8), the process proceeds to step S10.

(Step S9) The control unit 13 sets the condition display permissibility flag to "1." Then, the process proceeds to step S9.

(Step S10) The control unit 13 determines whether "null" is set in the Current Host ID column in the selected record. If "null" is set in the Current Host ID column (yes at step S10), the process proceeds to step S13. If "null" is not set in the Current Host ID column, i.e., if the Current Host ID column has a value other than "null" (no at step S10), the process proceeds to step S11.

(Step S11) The control unit 13 determines whether the current host ID in the selected record matches the current host ID received at step S1. If they match (yes at step S11), the process proceeds to step S12. If they do not match (no at step S11), the process proceeds to step S13.

(Step S12) The control unit 13 sets the condition display permissibility flag to "1." Then, the process proceeds to step S13.

(Step S13) The control unit 13 sets a display permissibility determination result in the display permissibility flag on the basis of the display permissibility flag, condition display permissibility flag, and combining condition with reference to a next condition ID setting table. Then, the process proceed to step S14.

FIG. 15 is a view for explaining the next condition ID setting table.

The next condition ID setting table T8 has the following columns: Condition Display Permissibility flag, Display Permissibility flag, and Next Display Permissibility Determination Result.

For example, in the case where a condition display permissibility flag is "1," a display permissibility flag is "null" and a combining condition is "AND", the control unit 13 sets the display permissibility flag to "1." As another example, in the case where a condition display permissibility flag is "0," a display permissibility flag is "1," and a combining condition is "OR," the control unit 13 sets the display permissibility flag to "1."

Refer now back to FIG. 14.

(Step S14) The control unit 13 determines whether the next condition ID of the condition extracted at step S3 has a value other than "null." If the next condition ID has a value other than "null" (yes at step S14), the process proceeds to step S15. If the next condition ID is "null" (no at step S14), the process proceeds to step S16.

(Step S15) The control unit 13 sets a variable of combining condition to the combining condition of the selected record. This combining condition is used as a combining condition for the next selected record (combining condition to be used at step S13). Then, the process proceeds to step S5.

(Step S16) The control unit 13 determines whether the display permissibility flag is "1." If the display permissibility flag is "1" (yes at step S16), the process proceeds to step S17. If the display permissibility flag is not "1" (no at step S16), the process proceeds to step S5.

(Step S17) The control unit 13 registers the content ID in a content list, which is not illustrated. The content of the content ID registered in the content list is to be provided for the client apparatus 2.

(Step S18) The control unit 13 sets the display permissibility flag (variable) to "null." In addition, the control unit 13 sets the combining condition (variable) to "null." Then, the process proceeds to step S5.

(Step S19) The control unit 13 searches the content management table T2 on the basis of the content IDs registered in the content list. Then, the sending and receiving unit 12 sends the contents of content to the client apparatus 2.

As described above, the server apparatus 3 includes the sending and receiving unit 12 that receives the unique information of a plurality of communication host apparatuses 1 that the client apparatus 2 obtains by searching for a connection destination before and after moving, the storage unit 11 that stores therein the identification information of content that is provided for the client apparatus 2 according to the state of the client apparatus 2, in association with the state, and the control unit 13 that specifies the state of the client apparatus 2 on the basis of the unique information that the sending and receiving unit 12 obtains before and after moving, and specifies content according to the moving route of the client apparatus 2 with reference to the storage unit 11.

With the above configuration, it is possible to provide content based only on whether a communication host device is within or outside a coverage area, without using the positional information of a user.

In addition, information before and after a movement of the communication host apparatus 1 is sent, which makes it possible to provide content that is more suitable for user's condition. For example, not only information that is provided when the communication host apparatus 1 is located in the area A or in the area B, for example, different content may be provided for the user of the client apparatus 2 on the basis of information indicating a movement from the area A to the area B or from the area D to the area B.

In addition, the communication host apparatuses 1 are narrowed down to those in a range of a content provider, which reduces user's load of searching for and selecting content. This is not compatible with an increase in the number of communication host apparatuses 1 automatically scanned and registered.

Additionally, by keeping information indicating that the communication host apparatuses 1 are in or out, a switch from which communication host apparatus 1 to which communication host apparatus 1 is statistically confirmed. The effects of guide information or the like may be converted into a numerical value.

In this connection, the processes that are performed by the server apparatus 3 may be performed by a plurality of apparatuses in a distributed manner. For example, one apparatus may be configured to specify content to be provided for the client apparatus 2, and another apparatus may be configured to provide the specified content for the client apparatus 2.

Heretofore, the server apparatus and content specifying method of the embodiment have been described in the embodiment illustrated. The configuration is not limited thereto, and the components may be replaced with other components having equivalent functions or other components. In addition, other desired configurations and steps may be added.

Further, two or more desired configurations (features) in the above-described embodiment may be combined.

The above-described processing functions may be implemented by using a computer. In this case, a program is prepared, which describes processes for the functions of the server apparatus 3. A computer implements the above-described processing functions by executing the program. The program describing the intended processes may be stored on a computer-readable storage medium. Computer-readable storage media include magnetic storage devices, optical discs, magneto-optical storage media, semiconductor memories, and others. The magnetic storage devices include hard disk drives, flexible disks (FDs), magnetic tapes, and others. The optical discs include DVDs, DVD-RAMs, CD-ROMs, CD-RWs, and others. The magneto-optical storage media include magneto-optical disks (MOs) and others.

To distribute the program, portable storage media, such as DVDs and CD-ROMs, on which the program is stored, may be put on sale. Alternatively, the program may be stored in the storage device of a server computer and may be transferred from the server computer to other computers over a network.

A computer which is to execute the above program stores in its local storage device the program recorded on a portable storage medium or transferred from the server computer, for example. Then, the computer reads the program from the local storage device, and runs the program. The computer may run the program directly from the portable storage medium. Also, while receiving the program being transferred from the server computer over a network, the computer may sequentially run this program.

In addition, the above-described processing functions may also be implemented wholly or partly by using a DSP (digital signal processor), an ASIC (application specific integrated circuit), a PLD (programmable logic device), or other electronic circuits.

According to one aspect, it is possible to provide significant information for users.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

The invention claimed is:

1. A server apparatus comprising:
   a memory which stores therein identification information of content that is sent to a client apparatus according to a state of the client apparatus, in association with the state; and
   a processor which performs a process including,
      receiving unique information of communication host apparatuses, the unique information being obtained by the client apparatus searching for a connection destination before and after a movement of the client apparatus,
      specifying areas covered by the communication host apparatuses, based on the unique information received, the unique information being obtained before and after the movement,
      determining, upon determining that the client apparatus is in a first area covered by a first communication host apparatus before the movement, whether the client apparatus is in an overlapping area of the first area and a second area covered by one or more second communication host apparatuses after the movement,
      specifying first content with reference to the memory upon determining that the client apparatus is in the overlapping area,
      specifying second content with reference to the memory upon determining that the client apparatus is not in the overlapping area, and
      sending the specified content to the client apparatus.

2. A content specifying method comprising:
   receiving, by a computer, unique information of communication host apparatuses, the unique information being obtained by a client apparatus searching for a connection destination before and after a movement of the client apparatus;
   specifying, by the computer, areas covered by the communication host apparatuses, based on the unique information received, the unique information being obtained before and after the movement;
   determining, upon determining that the client apparatus is in a first area covered by a first communication host apparatus before the movement, whether the client apparatus is in an overlapping area of the first area and a second area covered by one or more second communication host apparatuses after the movement;
   specifying first content with reference to a memory upon determining that the client apparatus is in the overlapping area;
   specifying second content with reference to the memory upon determining that the client apparatus is not in the overlapping area, the memory storing therein identification information of content that is sent to the client apparatus according to a state of the client apparatus, in association with the state; and
   sending, by the computer, the specified content to the client apparatus.

3. A non-transitory computer-readable storage medium storing a program that causes a computer to perform a process comprising:
   receiving unique information of communication host apparatuses, the unique information being obtained by a client apparatus searching for a connection destination before and after a movement of the client apparatus;
   specifying areas covered by the communication host apparatuses, based on the unique information received, the unique information being obtained before and after the movement;
   determining, upon determining that the client apparatus is in a first area covered by a first communication host apparatus before the movement, whether the client apparatus is in an overlapping area of the first area and a second area covered by one or more second communication host apparatuses after the movement;
   specifying first content with reference to a memory upon determining that the client apparatus is in the overlapping area;
   specifying second content with reference to the memory upon determining that the client apparatus is not in the overlapping area, the memory storing therein identification information of content that is sent to the client apparatus according to a state of the client apparatus, in association with the state; and
   sending the specified content to the client apparatus.

* * * * *